United States Patent
de Wijs et al.

(10) Patent No.: US 11,338,291 B2
(45) Date of Patent: May 24, 2022

(54) JET FLOW POWER CONTROL FOR OBJECT SORTING

(71) Applicants: IMEC VZW, Leuven (BE); Katholieke Universiteit Leuven, KU LEUVEN R&D, Leuven (BE)

(72) Inventors: Koen Johannes Hubertus Gerardus de Wijs, Kessel-Lo (BE); Chengxun Liu, Kessel-Lo (BE)

(73) Assignees: IMEC VZW, Leuven (BE); KATHOLIEKE UNIVERSITEIT LEUVEN, KU LEUVEN R&D, Leuven (BE)

( * ) Notice: Subject to any disclaimer, the term of this patent is extended or adjusted under 35 U.S.C. 154(b) by 252 days.

(21) Appl. No.: 16/473,821

(22) PCT Filed: Dec. 26, 2017

(86) PCT No.: PCT/EP2017/084579
§ 371 (c)(1),
(2) Date: Jun. 26, 2019

(87) PCT Pub. No.: WO2018/122215
PCT Pub. Date: Jul. 5, 2018

(65) Prior Publication Data
US 2019/0336974 A1 Nov. 7, 2019

(30) Foreign Application Priority Data
Dec. 27, 2016 (EP) ..................................... 16206934

(51) Int. Cl.
*G01N 15/00* (2006.01)
*B01L 3/00* (2006.01)
(Continued)

(52) U.S. Cl.
CPC ........... *B01L 3/502761* (2013.01); *B01L 7/54* (2013.01); *G01N 15/10* (2013.01);
(Continued)

(58) Field of Classification Search
CPC ...... B01L 3/502761; B01L 7/54; G01N 15/10
See application file for complete search history.

(56) References Cited

U.S. PATENT DOCUMENTS

2015/0328637 A1 11/2015 Perrault, Jr. et al.

FOREIGN PATENT DOCUMENTS

| WO | 2016/079269 A1 | 5/2016 |
| WO | 2016/122553 A1 | 8/2016 |
| WO | 2016/122706 A1 | 8/2016 |

OTHER PUBLICATIONS

PCT International Search Report and Written Opinion, PCT International Application No. PCT/EP2017/084579, dated Mar. 12, 2018, 16 pages.

*Primary Examiner* — Brian J. Sines
(74) *Attorney, Agent, or Firm* — McDonnell Boehnen Hulbert & Berghoff LLP

(57) ABSTRACT

Disclosed herein are microfluidic actuators for selecting objects in a fluid stream comprising a plurality of objects. In some embodiments, the actuator comprises an object detection means adapted for, upon arrival of an object, identifying whether an object is an object of interest. It further comprises a heater adapted for generating a jet flow for deflecting an object of interest from the fluid stream and a controller for activating the heater as function of the detection of an object of interest using a nucleation signal. The controller is adapted for obtaining temperature information of the heater and for adjusting a nucleation signal for the heater taking into account the obtained temperature information. Also disclosed are microfluidic systems and diag- (Continued)

nostic devices comprising the microfluidic actuators of the disclosure, as well as methods of use thereof.

11 Claims, 15 Drawing Sheets

(51) Int. Cl.
  *B01L 7/00* (2006.01)
  *G01N 15/10* (2006.01)
(52) U.S. Cl.
  CPC . *B01L 2200/0652* (2013.01); *B01L 2200/147* (2013.01); *B01L 2300/0864* (2013.01); *B01L 2300/1827* (2013.01); *B01L 2400/0442* (2013.01); *G01N 2015/1081* (2013.01)

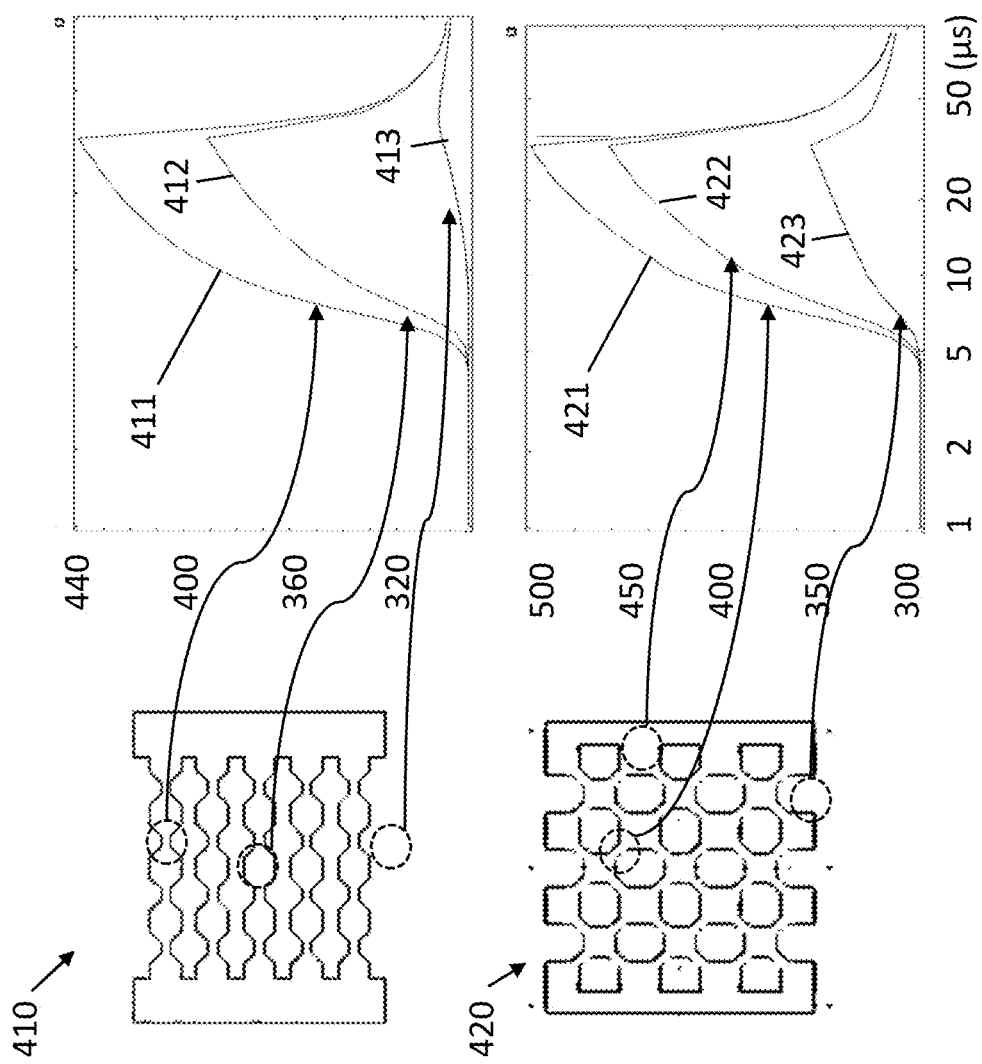
FIG. 4 [cont'd]

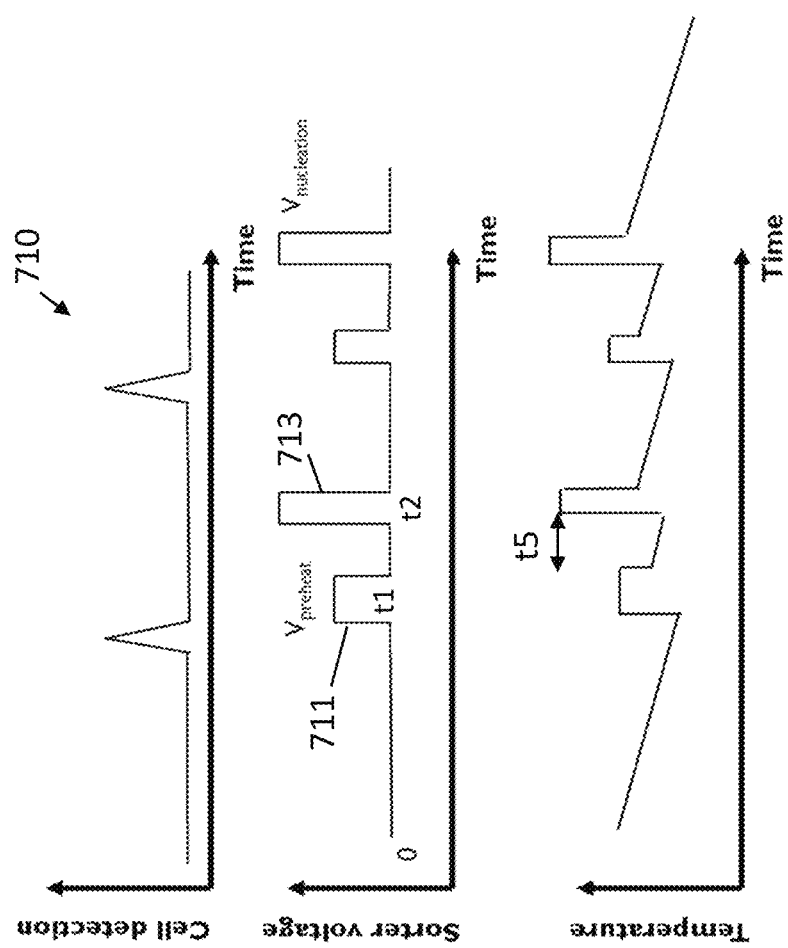
FIG. 7 [cont'd]

JET FLOW POWER CONTROL FOR OBJECT SORTING

CROSS-REFERENCE TO RELATED APPLICATIONS

This application is a national stage application under 35 U.S.C. § 371 of International Application No. PCT/EP2017/084579, filed Dec. 26, 2017, which claims the benefit of priority from European Application No. EP 16206934.8, filed Dec. 27, 2016. The disclosures of all of the above applications are incorporated by reference herein in their entireties.

FIELD

The disclosure relates to the field of microfluidic actuation. More specifically it relates to a system and method for controlling powering of a microbubble jet flow generator.

BACKGROUND

Microfluidic cell sorters are devices which sort and classify particles, such as cells, in a flow and send them to different directions (e.g. different channels or outlets) under a predetermined factor or condition. For example, a sorter may send particles with attached thereto predetermined fluorophores towards a sorting outlet, upon fluorescent detection thereof, and other particles to a different channel. Cells flowing in a microfluidic chip can be sorted by applying a force on them upon crossing the sorter, for example with precisely timed jet flows. After detection of a cell of interest (for example, upon a cell passing a detection region), a short pulse is applied to an actuator. The resulting jet flow deflects the passing cell to a collection outlet. For other cells, the jet flow is not generated and these cells flow to a waste channel.

The jet flow power and timing are important to acquire a collected sample with a high purity (the proportion of cells of interest to the total number of sorted cells) and recovery (the proportion of sorted cells of interest compared to the total cells of interest that passed the detection region). Due to multiple actuations, actuation heating may take place, generating variations in the amount of liquid moved in a given amount of time. For example, in case of actuation via Joule heating, every actuation results in a slight temperature increase of the actuator. The chip bulk temperature and especially the temperature at the nucleation points will vary during an experiment while using constant nucleation pulses for jet flow actuation. An increased temperature leads to a reduced time to nucleation, so a shorter time between applying a Joule heating pulse and actual jet flow actuation. Moreover, an increased temperature increases the jet flow power which can lead to the generation of an undesired jet flow (e.g. untimely jet flow, which may lead to wrong sorting), or even damage to the actuator and/or the channel. On the other hand, reduction of the number of triggering or actuation events (e.g. in a diluted fluid) may lead to lowering of the chip operation temperature and unstable sorting, a higher amount of power being necessary to activate actuation.

US patent application US2015/0328637 discloses a method for absorbing pressure transients using a pressure dampening system. This solution is bulky it needs movable elements which are prone to mechanical failure (especially disturbing if the fluid, such as blood, tends to clot in interstices of the movable elements). Preheating pulses are also disclosed for temperature stabilization, avoiding problems associated with unstable sorting. This solution may result in more heating, as it does not address the problem of actuation damage, and it requires a lot of energy.

If a nucleation pulse is applied, a jet flow is created that sorts a passing cell. The jet flow has to be precisely timed and at correct power. A too high power can damage the cell or object and heater element and can even prevent correct sorting. A too low power does not deflect a passing cell enough to be sorted to a collection outlet for sorted cells and will flow into the middle outlet for unsorted cells. To keep the jet flow event precisely timed at a constant power, the temperature of the nucleation zones during a sorting pulse should stay constant.

SUMMARY

It is an object of embodiments of the present disclosure to provide methods and systems for object sorting in microfluidics.

In some embodiments, high speed object sorting can be obtained without the quality of sorting being reduced.

In some embodiments, variations in temperature, induced by previous sorting actions, can be compensated for.

The present disclosure relates to a microfluidic actuator for selecting objects in a fluid stream comprising a plurality of objects, the actuator comprising an object detection means adapted for, upon arrival of an object, identifying whether an object is an object of interest, a heater adapted for generating a jet flow for deflecting an object of interest from the fluid stream, and a controller for activating the heater as function of the detection of an object of interest using a nucleation signal, wherein the controller is adapted for obtaining temperature information of the heater and for adjusting a nucleation signal for the heater taking into account the obtained temperature information, characterized in that the controller is adapted for sending a probe pulse to the heater for measuring the temperature, before a jet flow inducing nucleation pulse is fired for generating the jet flow, the probe pulse having an amplitude and duration low enough such that the temperature of the heater falls back to the baseline after the probe pulse is turned off and before the nucleation pulse is turned on. In some embodiments, nucleation of bubbles can take place more precisely at the time required for sorting objects since the temperature of the heater is taken into account and consequently variations in temperature due to the history of operation can be taken into account. In this way, overheating can be avoided and the temperature of the device does not depend upon the frequency of the triggering signal, obtaining stable and steady actuation with high sorting rate, purity and recovery.

In some embodiments, the heater may be a resistive heater and wherein the system is adapted for measuring a resistance of the heater for obtaining temperature information of the heater. In some embodiments, accurate temperature information of the heater elements can be obtained by using the heater also as resistance temperature detector (RTD). In some embodiments, asynchronous adaptation can be provided by monitoring the temperature of the heating element and nucleation sites.

In some embodiments, the controller may be adapted for sending a probe pulse to the heater for measuring the temperature, before a jet flow inducing nucleation pulse is fired for generating the jet flow. The jet flow inducing nucleation pulse is the part of the nucleation signal used for generating the jet flow. The probe pulse thereby is selected to be sufficiently low in amplitude and short in duration, such that it does not create vapor bubbles and it has only a small or minimal influence on the hotspot temperature it measures. The heat should be dissipated as quickly as possible so that the hotspot temperature falls back to the baseline after the probe pulse is turned off and before the nucleation pulse is turned on. The probe pulse also is selected such that the signal to noise ratio obtained results in accurate determination of the hotspot temperature.

In some embodiments, the controller may be adapted for sending the probe pulse whereby the probe pulse is adapted for inducing pre-heating of the heater. In some embodiments, both temperature measurement and pre-heating (or part of the pre-heating) can be performed using a single pulse.

In some embodiments, the system may comprise a closed loop between the object detection means, the heater and the controller for modulating a jet flow inducing nucleation pulse as function of varying object throughput and arrival time between objects. In some embodiments, compensation for temperature fluctuation (for overheating of the chip and for lowering operation temperature of the chip) can be provided during sorting thus taking into account variation of throughput of particles of interest in the fluid stream and random arrival of objects. In some embodiments, automatic compensation can be provided.

In some embodiments, the controller may be adapted for adjusting a nucleation signal by adjusting the height or width of a jet flow inducing nucleation pulse for generating the jet flow. In some embodiments, compensation for temperature effects caused by a variable passing rate of objects of interest and random arrival of objects can be compensated for by adjusting directly the nucleation signal for generating the jet flow.

In some embodiments, the controller may be adapted for inducing a number of pre- heating nucleation pulses for obtaining a constant temperature prior to generating the jet flow. The one or more pre-heating nucleation pulses typically are part of the nucleation signal. In some embodiments, the system may make use of preheating, such that the effect of variation in passing rate of objects of interest has less effect on the temperature of the microfluidic actuator.

In some embodiments, the controller may be adapted for varying a pulse width or amplitude of a pre-heating pulse for obtaining a constant temperature prior to generating the jet flow.

In some embodiments, the controller may be adapted for performing in-pulse nucleation control of the jet flow inducing nucleation pulse for generating the jet flow.

The present disclosure also relates to a microfluidic actuator wherein the heater comprises a plurality of microheaters, each comprising at least one microbubble nucleation site. In some embodiments, a microfluidic object sorter is provided with stable operation even in cases of variable triggering rate with reduced energy consumption.

The present disclosure furthermore relates to a microfluidic system comprising a microfluidic actuator as described above for selecting object(s) of interest. In some embodiments, the microfluidic system may be implemented as one or more chips, e.g. one or more cell sorter chips. In some embodiments, the microfluidic system may be implemented as a cartridge comprising one or more chips, e.g. one or more cell sorter chips.

In some embodiments, the microfluidic system may be a diagnostic device. In some embodiments, the microfluidic system may be in one example adapted for deriving a pathology based on the selected object(s) of interest.

The present disclosure also relates to a diagnostic device comprising a microfluidic system as described above.

In some embodiments, the diagnostic device may be an apparatus comprising the cartridge and/or the chips. Part of the hardware and/or the software may be in the cartridge. Part of the hardware and/or the software may be outside the cartridge.

The present disclosure also relates to a method for selecting objects in a fluid stream comprising a plurality of objects, the method comprising:
monitoring a fluid stream for identifying objects of interest therein,
generating a jet flow for deflecting an object of interest from the fluid stream wherein for generating a jet flow, the method comprises obtaining temperature information of the heater adjusting a nucleation signal for the heater taking into account the obtained temperature, characterized in that obtaining the temperature further comprises introducing probe current pulses for obtaining temperature information, whereby the probe current pulses are adapted to not induce nucleation at the heating element, the probe pulses further having an amplitude and duration low enough such that the temperature of the heater falls back to the baseline after the probe pulse is turned off and before the nucleation pulse is turned on. In some embodiments, a highly adaptable asynchronous control upon bubble nucleation in a jet flow generator can be obtained, thereby obtaining a substantially stable and predeterminable jet flow generation for deflecting objects of interest.

In some embodiments, the method may comprise obtaining temperature information based on a resistance measurement of the heater. In some embodiments, self-sensing temperature measurements can be used, without the need of extra wires or temperature sensors which can introduce artifacts.

In some embodiments, obtaining the temperature may further comprise introducing probe current pulses for obtaining temperature information, whereby the probe current pulses are adapted to not induce nucleation at the heating element. In some embodiments, minimum disturbance in powering the actuator is introduced with the temperature sensing, and calibration and recalibration can be done for example during heating or cooling of the heating element of the actuator.

In some embodiments, adapting the nucleation signal upon object detection in order to compensate for variations in the temperature of the heating element further may comprise adapting the width and/or amplitude of a powering pulse according to the temperature measurement.

In some embodiments, simple signal control with a PWM and implementable with switches and drivers can be obtained.

The present disclosure also relates to a microfluidic actuator for selecting objects in a fluid stream comprising a plurality of objects, the actuator comprising an object detection means adapted for, upon arrival of an object, identifying whether an object is an object of interest, a heater adapted for generating a jet flow for deflecting an object of interest from the fluid stream, and a controller for activating the heater as function of the detection of an object of interest using a nucleation signal, wherein the controller is adapted for obtaining temperature information of the heater and for adjusting a nucleation signal for the heater taking into account the obtained temperature information. Further features may be as described above.

The present disclosure also relates to a method for selecting objects in a fluid stream comprising a plurality of objects, the method comprising:
monitoring a fluid stream for identifying objects of interest therein,
generating a jet flow for deflecting an object of interest from the fluid stream wherein for generating a jet flow, the method comprises obtaining temperature information of the heater adjusting a nucleation signal for the heater taking into account the obtained temperature. Further method steps may be as described above.

Particular and preferred aspects of the disclosure are set out in the accompanying independent and dependent claims. Features from the dependent claims may be combined with features of the independent claims and with features of other dependent claims as appropriate and not merely as explicitly set out in the claims.

These and other aspects of the disclosure will be apparent from and elucidated with reference to the embodiment(s) described hereinafter.

Figure 1:
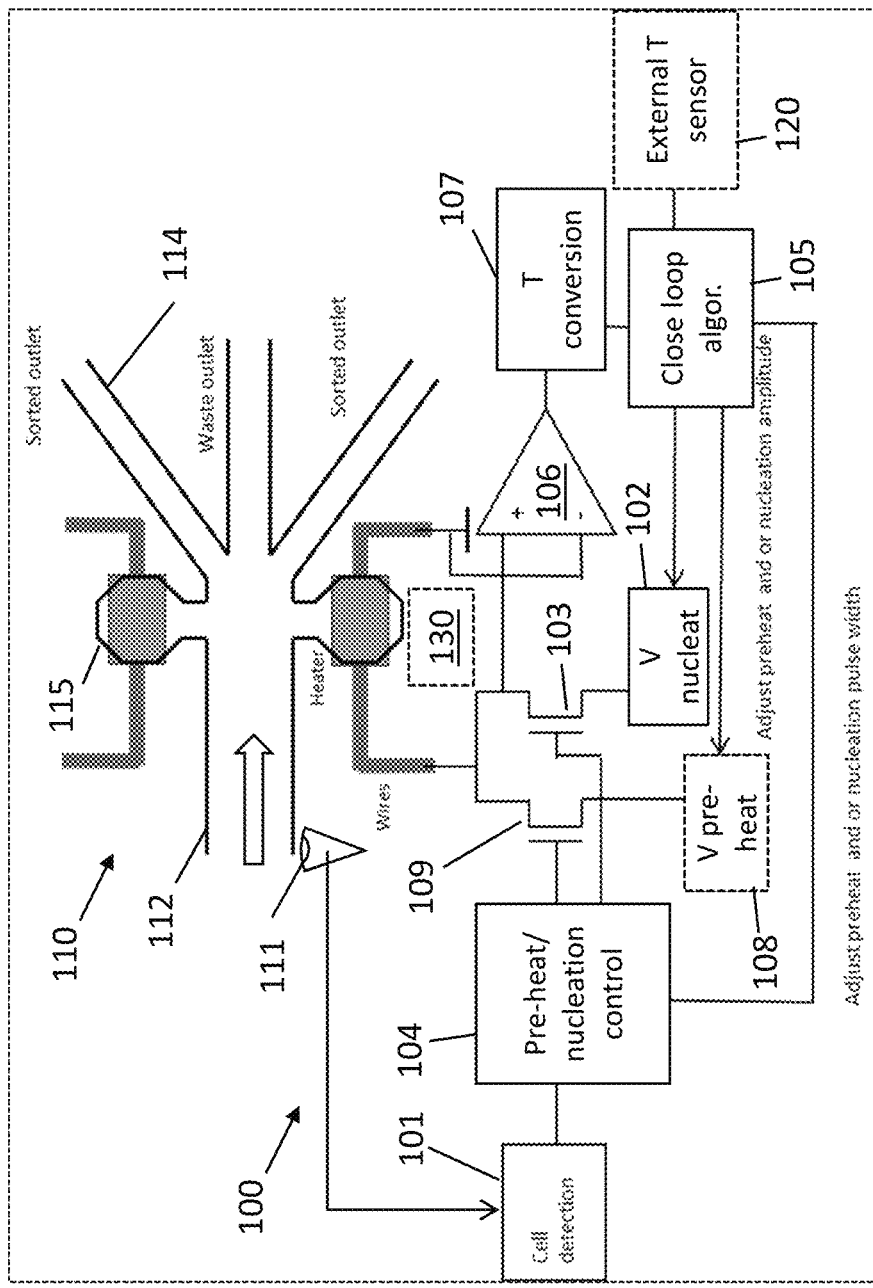
FIG. 1 illustrates a control system suitable for a jet flow generator for microfluidic sorting of objects, according to example embodiments of the present disclosure.

The drawings are only schematic and are non-limiting. In the drawings, the size of some of the elements may be exaggerated and not drawn on scale for illustrative purposes.

Any reference signs in the claims shall not be construed as limiting the scope. In the different drawings, the same reference signs refer to the same or analogous elements.

DETAILED DESCRIPTION OF ILLUSTRATIVE EMBODIMENTS

The present disclosure will be described with respect to particular embodiments and with reference to certain drawings but the disclosure is not limited thereto. The drawings described are only schematic and are non-limiting. In the drawings, the size of some of the elements may be exaggerated and not drawn on scale for illustrative purposes. The dimensions and the relative dimensions do not correspond to actual reductions to practice of the disclosed embodiments.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the disclosure described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the disclosure described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present disclosure, the only relevant components of the device are A and B.

Reference throughout this specification to "one embodiment" or "an embodiment" means that a particular feature, structure or characteristic described in connection with the embodiment is included in at least one embodiment of the present disclosure. Thus, appearances of the phrases "in some embodiments," "in one embodiment," or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the disclosure, various features of the disclosure are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that a claimed embodiment requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment.

Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Where in embodiments of the present disclosure reference is made to "generating a jet flow", reference is made to the production of a pressure in a fluid by inducing a jet flow therein. Jet flows normally are used to deflect particles in a fluid by locally increasing the pressure. The generation of jet flow in embodiments of the present disclosure is based on displacements of fluid due to nucleation, or nucleation and growth, of bubbles, e.g. microbubbles, which are generated in nucleation sites by Joule heating. The bubble nucleation can happen at hotspots of the heater where the electric current density is the highest.

In the following, the term "actuator" will be used as equivalent to a "jet flow generator". Thus, a "microfluidic actuator" within the frame of the present disclosure refers to a jet flow generator adapted for producing a pressure locally, by generation of bubbles (e.g. microbubbles), in a fluid confined in a microfluidic channel or microfluidic system. "Actuation pulse" refers to the electrical signal sent to the heater in order to induce bubble nucleation and hence jet flow for object deflection. "Preheating pulse" refers to electrical signal sent to the heater in order to preheat the heater up to predetermined temperature (e.g. baseline temperature). "Probe pulse" refers to the electrical signal sent to the heater in order to measure the heater resistance to derive the heater temperature. Neither the preheating pulse nor the probe pulse is capable of inducing bubble nucleation or jet flow.

Where in embodiments of the present disclosure reference is made to an object, reference is made to any of a particle or biological cell, bacteria, virus, biological particles such as exosomes and vesicles.

Where in embodiments of the present disclosure reference is made to a power signal, reference may be made to a nucleation signal.

In a first aspect, the present disclosure relates to a microfluidic actuator for selecting objects in a fluid stream comprising a plurality of objects. The latter is typically based on generating a jet flow by microbubble generation. The actuator comprises an object detection means adapted for, upon arrival of an object, identifying whether an object is an object of interest. It also comprises a heater adapted for generating a jet flow for deflecting an object of interest from the fluid stream. It furthermore comprises a controller for activating the heater as function of the detection of an object of interest using a nucleation signal, wherein the controller is adapted for obtaining temperature information of the heater and for adjusting a nucleation signal for the heater taking into account the obtained temperature information. In some embodiments according to the present disclosure, the controller may be adapted for sending a probe pulse to the heater for measuring the temperature, before a jet flow inducing nucleation pulse is fired for generating the jet flow, the probe pulse having an amplitude and duration low enough such that the temperature of the heater falls back to the baseline after the probe pulse is turned off and before the nucleation pulse is turned on.

When a jet flow is generated for deflecting an object of interest for selecting it, the heater locally increases the temperature in the fluid, resulting in the nucleation of water to create small water vapor bubbles (by bringing the fluid to the nucleation temperature. These vapor bubbles create the jet flow. The heat used for inducing this nucleation may result in an increase of temperature and a different behavior of the heater. To make sure that the heater is operating properly and accurately, i.e. that it creates an appropriate jet flow at the moment the particle is to be deflected, embodiments of the present disclosure thus take into account temperature information for controlling the heater, e.g. for nucleation of vapor bubbles.

By way of illustration, embodiments of the present disclosure not being limited thereto, standard and optional features of actuators will be discussed with reference to the drawings.

FIG. 1 shows an exemplary embodiment of a microfluidic actuator 100 according to some embodiments of the present disclosure, for controlling the deflection of particles in a microfluidic system 110. An object detection module 101, e.g. comprising a detector 111 in the channel 112 of the microfluidic system 110, can be used to determine which type of object, e.g. cell or particle, is flowing (according to the block arrow) along the channel 112, and then decides through which sorting outlet the object must be sent, e.g. which actuator (upper or lower) should be triggered. The source 102 is connected to a heating element 113, also referred to as heater, via a switch 103 which is controlled by a controller 104. When the controller 104 turns the switch 103 on, the heater is connected to a potential given by a power source 102, the heating element heats up, and actuation is provided by forming microbubbles.

The microfluidic actuator 100 further comprises a temperature sensor for measuring temperature and is arranged in a closed loop algorithm 105. Information is sent to the pulse controller 104 which may perform any necessary adjustments for compensation of temperature variations in the heating element. The algorithm of the controller may provide adjustments in different ways, such as adjusting preheating, adjusting the number of power pulses used, adjusting a power signal pulse length, adjust a power signal amplitude, etc. In some embodiments of the present disclosure, the powering signal is a pulse, for example a voltage or current pulse (square, triangular, or any other suitable pulse) generated by a power source, and the control system can control the shape and/or size of the powering signal according to any existing and well known techniques, for example controlling the pulse width, amplitude, by adding a continuous variable signal for maintaining isothermal conditions in the actuator, etc. Compensation can be performed upon triggering the actuator, and/or shortly after and/or before. This allows great control and accuracy of the powering signal.

The temperature of the heating element can be measured by measuring its resistance, for example as a resistance temperature detector (RTD). For example, the controller 104 may additionally control signals for resistance measurement. For example, the controller 104 and switch 103 may provide one or more probe pulses to the actuator, whose amplitude and/or width is adapted to provide a resistance measurement without producing bubble nucleation. For example, the probe pulse can be sent when an object is detected in the object detection module 101, but before triggering actuation. In some embodiments, the probe pulse for resistance measurement is provided by an auxiliary switch and source, allowing different switching sequences which may overlap and different amplitude control with adjustable sensitivities. The temperature may be measured, for example by measuring the resistance of the heating elements, e.g. via an operational amplifier 106, further additionally via the probe pulses (e.g. provided by the controller 104 and switch 103, or optional auxiliary switch and source), and a module 107 for resistance-temperature conversion of the heating element. For example a processor, e.g. comprising memory modules with lookup tables and calibration information, analog-to-digital converters, etc. can be used.

In some embodiments, resistance sensing may be performed by other means, such as comparators, bridges, etc., further including resistance-temperature conversion. The temperature of the heating element 113 (and of the cavity, chip, etc.) may also be sensed via other means, such as thermocouples, etc. Temperature measurements may be performed either continuously, periodically, or shortly before triggering the actuator.

In some embodiments of the present disclosure, the control system may include pre-heating of the sample, either continuously, such as continuously until the end of the powering signal for triggering nucleation, or upon detection. In some embodiments, the controller 104 and switch 103 thus may provide a pre-heating pulse for heating the heating element before triggering nucleation. The pre-heating pulse may also be provided by an auxiliary source 108 and auxiliary switch 109 which may also provide probe pulses, thus reducing the number of electronic elements (however, different auxiliary switches and sources may allow simultaneous and simple pre-heating and probing sequences). The pre-heating signal may be regulated according to calibrated measurements and/or temperature measurements. In some embodiments, pre-heating may be performed by applying a multiple of pre-heating pulses in the actuator, and pre-heating control may be performed by modulating the number of pre-heating pulses, in order to have constant temperature, before the powering pulse is introduced. Alternatively or additionally, the pulse width or amplitude of the pre-heating pulses may also be modulated in order to have constant temperature before the powering pulse. The pre-heating pulse may finish right at the start of the powering pulse, although embodiments are not limited thereto.

In some embodiments, a separate temperature sensor 120 may be included in the control system to measure the temperature of the chip (chip bulk T sensor), of the substrate of the heating elements, of the heating chamber of the actuator, and/or even of the fluid in the actuator. This temperature can also be included in the closed loop algorithm 105, for further adjustments by the controller 104, e.g. for reducing errors in the closed loop algorithm.

In some embodiments, an optional cooling module 130 may be also included, and it may optionally be controlled by the controller 104, or by a separate controller. For example, the temperature of the chip, or of the substrate, or in general of the actuator may be kept at a temperature under room temperature (e.g. under 18° C.-24° C.), for example at around 4° C., or in general over the freezing temperature of the fluid being analyzed. The cooler may be an active cooler.

Only the control system for the lower actuator (for sending an object to the upper sorting channel 114) is shown, but the upper actuator 115 may also comprise a control system. Alternatively, the control system or parts thereof may be shared by the lower and upper actuator. Although a system is shown with three channels and two jet flow generating means, systems may comprise more or less channels and corresponding jet flow generating means.

Figure 2:
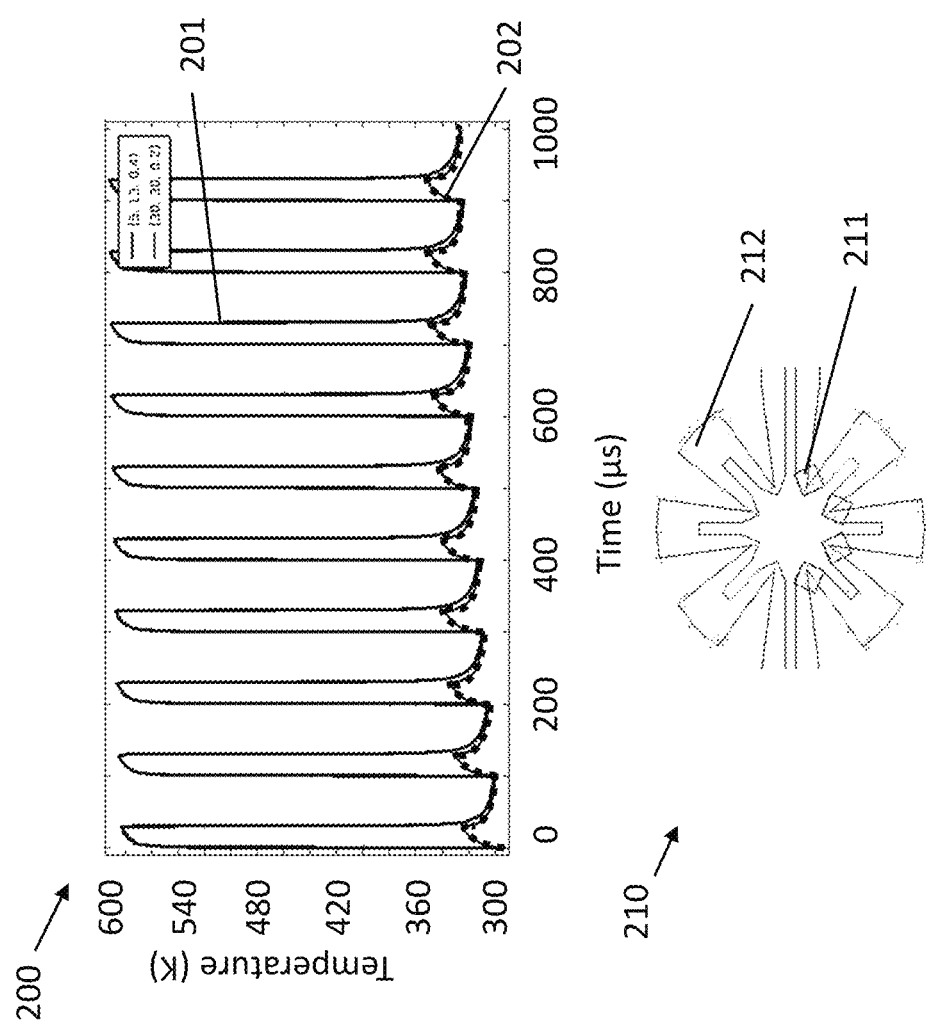
FIG. 2 illustrates a simulation of temperature increase in two spots of a microheater, as can be used in example embodiments of the present disclosure.

As indicated above, the system comprises a heater adapted for generating a jet flow for deflecting an object of interest from the fluid stream. In principle any type of heater could be used. In some embodiments, the heater may be a resistive heater. FIG. 2 shows, in the upper graph 200, the simulated behavior of the temperature versus time in two different points of an exemplary flower-shaped microheater 210 as shown in the lower drawing. For example, the powering pulses may be electrical current pulses, and heating may be Joule heating from power dissipation of the microbubble generator, which comprises a metallic sheet with a predetermined resistivity. While the resistivity depends on the material (e.g. on the metal), the resistance is an extrinsic property which depends on e.g. the shape of the material. Resistance is not homogeneous through the whole microbubble generator, and it presents a higher value in the nucleation site 211. Thus, at the corner of the microheater towards the center of the flower shape, the narrowing of the material induces a higher local resistance and the small angle between connectors to the nucleation site increase the local current density tremendously, where upon application of current, a bubble would nucleate. Each microheater 210 would provide 8 nucleation sites. Several microheaters can be combined to create one large heating element capable of generating hundreds of simultaneous vapor bubbles of similar size and duration, that can generate a powerful and short jet flow for high rate object sorting.

The temperature profile is simulated during a heat pulse at a nucleation site 211 and in a distal bulk part 212. The power dissipated as heat in the nucleation sites 211, shown as a continuous line, is higher than in the bulk region 212; thus, the increase of temperature 201 in the nucleation site is higher than the increase of temperature 202, shown as a dashed line, in the bulk region 212. The varying current density creates hotspots at the predefined nucleation sites were vapor bubbles will be created. In the graph, temperature is simulated for a time interval of 1 millisecond during which 10 powering pulses are sent in order to heat up the nucleation sites to a target, predetermined, temperature TP over the threshold temperature TT for producing nucleation of a bubble (which can be obtained from the nucleation temperature of the fluid). The temperature quickly increases at the nucleation spot and also cools down quickly. But the heat produced at the nucleation sites, and the other parts of the heater element, and also the low resistance wires of the heaters to a lesser extent, heat up during pulse application. The combination of these phenomena results in a temperature baseline increase, insofar as the heating element continues being powered. As a result, the heating element (and chamber) on average heats up after every nucleation pulse. Thus, multiple firings will increase the total chip temperature. For the same nucleation pulses, the actual temperature TN of the nucleation sites will also increase over the predetermined temperature TP. For example, the initial temperature of the unpowered heating element (basis line) is near 300 K, but after only 1 second it increased 30 degrees. This also affects the nucleation temperature, which increases from 580 K to almost 600 K.

In real situations, the objects do not arrive in a timed synchronous matter and the throughput of objects varies during an experiment. The system may be adapted to trigger actuation upon detection of an object in the fluid, so the triggering rate (the rate at which powering signals are sent to the nucleation sites) is not generally homogeneous. On top of that the random arrival of objects can result at certain times in the arrival of objects close to each other. Thus, the nucleation signal rate, and hence the baseline temperature, in actual sorting, not only increases, but also may decrease if the triggering rate is reduced, as can be seen in the upper and lowest graphs of FIG. 9.

Figure 3:
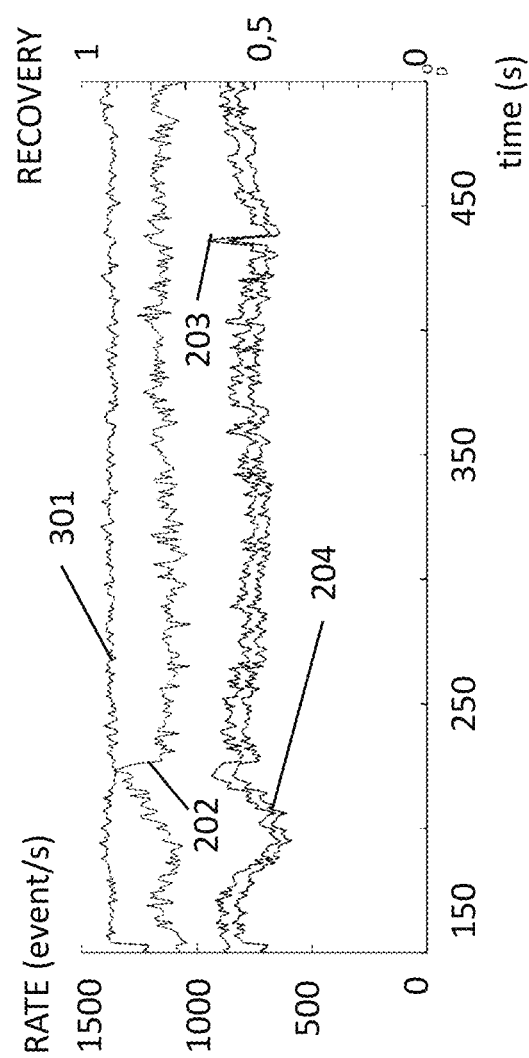
FIG. 3 illustrates variation of actuation rate and object recovery of an experiment of object sorting as can be used in example embodiments of the present disclosure.

In summary, the temperature of the heating element fluctuates, as can be seen in FIG. 3 showing the variation of event rates during an experiment lasting 350 seconds. The rate is given in events per second at the left axis, and the particle recovery at the right axis. The upper line 301 represents the firing rate per "red bead", the lower line 302 the "green bead" recovery, the previous to last line 303 the "red bead," and the lowest, last line 304 the heater actuations, which is very irregular. Because the density of particles is irregular, the basis line (e.g. the chip temperature) may decrease, affecting TN, which may not reach the predetermined temperature TP, and in extreme cases may even not reach the nucleation threshold temperature TT. As a result, it ultimately results in unstable microbubble generation and unstable jet flow power.

Some embodiments of the present disclosure provide an actuator and a method to regulate the powering pulse, so that the temperature of the nucleation site remains constant, regardless of firing rate fluctuation.

In some embodiments, the control system may comprise a closed-loop electronic controller, for automatically driving the powering signal by pulse amplitude modulation. The temperature of the heating element may be calculated from the resistance, using the element itself as a self-sensing temperature resistor. A feedback loop may be used to monitor current and temperature.

Different ways of controlling may be implemented.

In some embodiments of the present disclosure, the controller adapts the nucleation signal so as to keep a constant value of nucleation site temperature just before nucleating the bubble, for every triggering of the actuator. For example, the controller may perform regulation in order to set the nucleation site to a temperature TN such that it reaches a predetermined value TP. This predetermined temperature TP is higher than a minimum nucleation threshold temperature TT under which there is no nucleation. TP can be chosen according to the type of fluid, heater structure and its nucleation point, device tolerance, etc. In some embodiments of the present disclosure, TP can be set to a value lower than the maximum tolerance temperature TM over which damages and malfunction may occur (e.g. delamination in the substrate of the microheater and/or heating element, overheating, excessive pressure which compromises the integrity of the microfluidic channels, etc.).

In some embodiments in which no preheating pulses are provided, the controller may be adapted to send small probe pulses after the powering pulse is off, or right before a subsequent nucleation pulse, which allows correlation of the nucleation site temperature before and after the nucleation pulse is switched off, and allows power adjustment before the nucleation pulse is sent.

In some embodiments, the controller may be adapted to provide isothermal conditions in the actuator by introducing continuous heating of the actuator, for example by heating the whole actuator cavity, or the substrate on which the actuator is provided, with external heating means and/or by adjusting the power source for introducing an electrical current, smaller than the nucleation signal, in a heating element acting as a nucleation site, keeping the actuator at a constant temperature below nucleation temperature. The system may be adapted for turning off this continuous heating right after the powering pulse is introduced, in order to compensate for the added dissipated power. The period, in which the continuous heating should be off, can be determined by calibration and/or adjustment in a closed feedback loop. The temperature of the heating element can also be tracked using the feedback loop.

In some embodiments, pre-heating pulses and probe pulses can be combined.

In some embodiments, the controller may apply in-pulse power control (IPPC) means, for example the system may include means for temperature measurement with high temporal resolution, for detecting the nucleation event and for controlling the signal before, during and after the nucleation event. For example, temperature measurement means (e.g. thermal resistance sensor) can be included, for measuring thermal resistance of the heating element while triggering the actuator. The control system can be adapted (e.g. programmed) to maintain a constant powering signal, until an inflection in the thermal resistance/temperature is detected, at which point the powering signal can be turned off, or, for example, kept for a predetermined time before turning it off.

The lower drawing of FIG. 2 shows a flower-shaped microheater used in a microfluidic system, with 8 nucleation sites, separated in two halves (both halves may also be interconnected, or each half may be connected to other microheater halves, as long as they are connected to a power source). Because it takes time to cool down the flower shape, in some embodiments the nucleation sites may be spread evenly in the actuator (e.g. on the substrate, through the chamber) in order to reduce cooling time (because heat spreads more quickly) and allowing higher triggering rate.

Some non-limiting shapes and geometries, suitable for providing bubble nucleation by heating, will be discussed. These geometries are such that at least one region with reduced or narrow size and/or small angle between connectors between hotspots, and consequentially high electrical resistance and/or high electrical current density as compared to the rest of the body, is present. A microbubble generator (or more specifically a heating element) according to embodiments of the present disclosure may present one or more of these sets of nucleation sites (or more specifically one or more of these microheaters).

Figure 4:
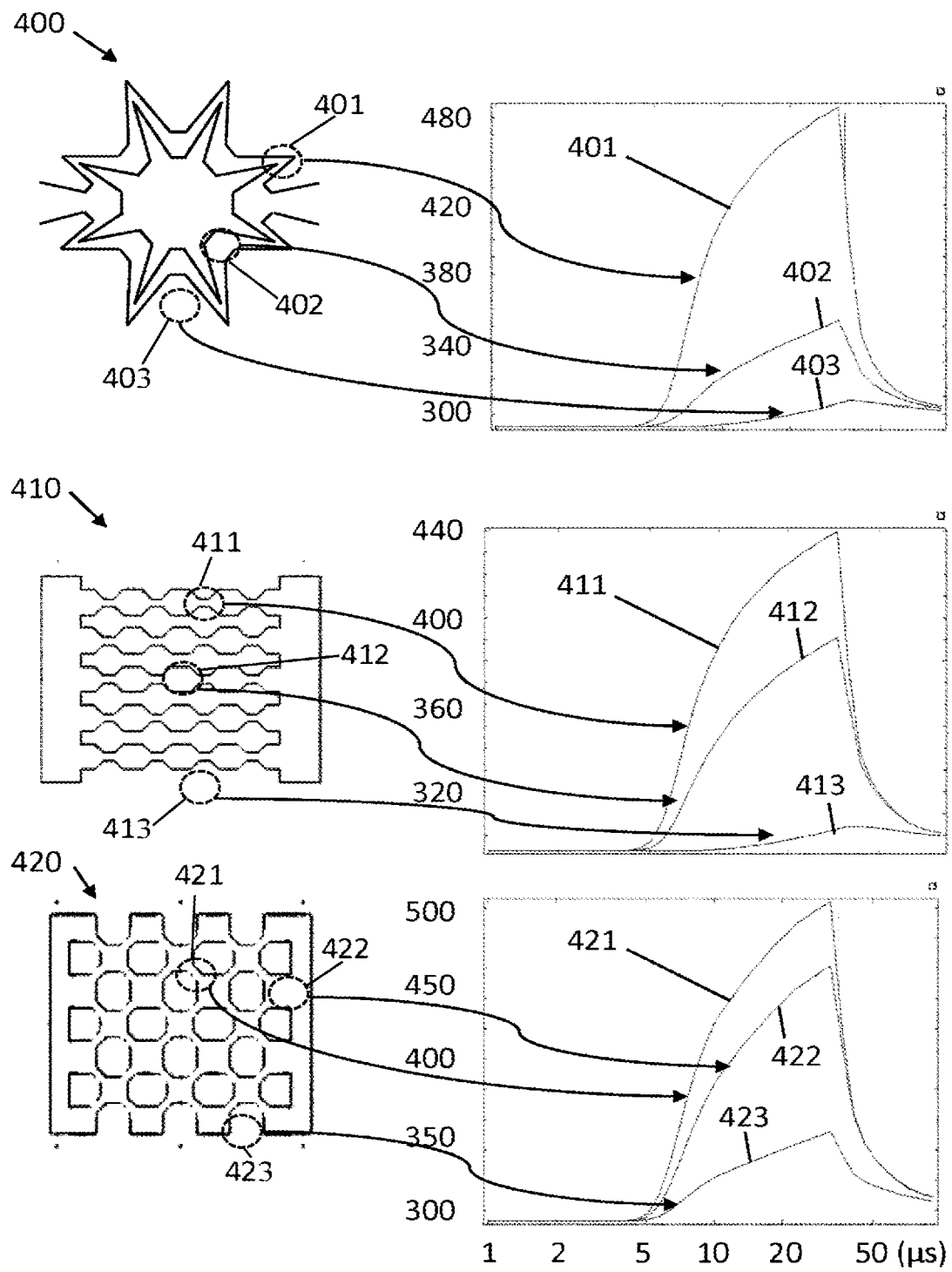
FIG. 4 illustrates three microheaters comprising microbubble nucleation sites and the temperature variation simulated for different spots thereof as can be used in example embodiments of the present disclosure.

Some suitable exemplary shapes which may reduce temperature increase during actuation are shown in FIG. 4. The star shape 400, line shape 410 and chessboard shape 420 are shown next to their respective temperature profiles (in Kelvin) vs time (in microseconds) during a single triggering of the actuator, during which an actuation signal (e.g. current) is sent through the microheater for bubble nucleation. The highest temperature profile 401, 411, 421 corresponds to the temperature in the nucleation sites which show, by design, the highest resistance and/or current density, as they are usually narrower than the bulk of the microheater and/or have small angle between connectors to them. The medium profile 402, 412, 422 correspond to the temperature in the bulk, and the lowest temperature profile 403, 413, 423 corresponds to the temperature in the chamber. Other features may be included for facilitating nucleation, such as bends, spikes, etc.

Figure 5:
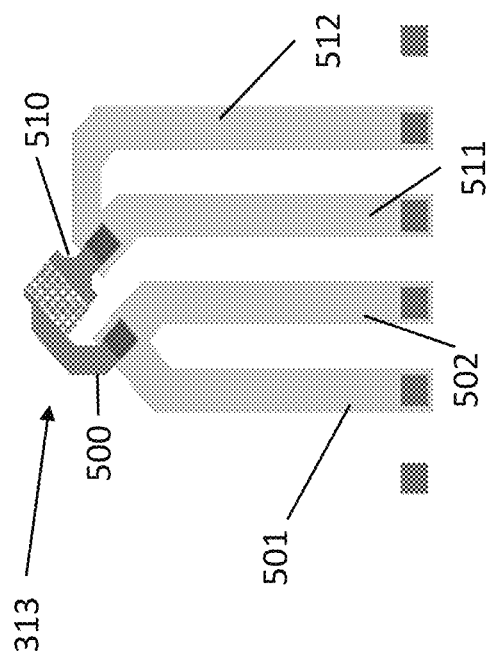
FIG. 5 illustrates a resistance probe for a microheater as can be used in example embodiments of the present disclosure.

Some embodiments of the present disclosure may comprise a four-point probe sensor to more accurately measure the temperature of the heating element, either as a self-sensing resistor or as a separate resistor unused for sorting, but that can be used for calibration of the chip to compensate for process variation of the chips during fabrication. FIG. 5 shows an exemplary four-point probe resistor, with a two pair of probes 501, 502, 511, 512 connected to each side 500, 510 of the heating element 313 of an actuator. The extra probe 502, 511 connected to each side allows a better measurement of the temperature, because it can remove the measurement error due to the variation of the wire resistance as a consequence of their temperature and the resistance variations between different chips due to fabrication process variations.

Additionally, an external temperature sensor can be included, for example to measure substrate, fluid, chip or in general actuator temperature. This can be used to calibrate the heating element and/or the RTD. For example, variations on manufacture may result in differences of resistance from chip to chip, which can be corrected. Additionally, an external temperature sensor can be used to improve the closed loop power control.

In a further aspect of the present disclosure, a method for selecting objects in a fluid stream comprising a plurality of objects is provided. The method comprises monitoring a fluid stream for identifying objects of interest therein and generating a jet flow for deflecting an object of interest from the fluid stream. The method also comprises obtaining temperature information of the heater and adjusting a power signal for the heater taking into account the obtained temperature. According to embodiments of the present disclosure, obtaining the temperature further comprises introducing probe current pulses for obtaining temperature information, whereby the probe current pulses are adapted to not induce nucleation at the heating element, the probe pulses further having an amplitude and duration low enough such that the temperature of the heater falls back to the baseline after the probe pulse is turned off and before the nucleation pulse is turned on.

Figure 6:
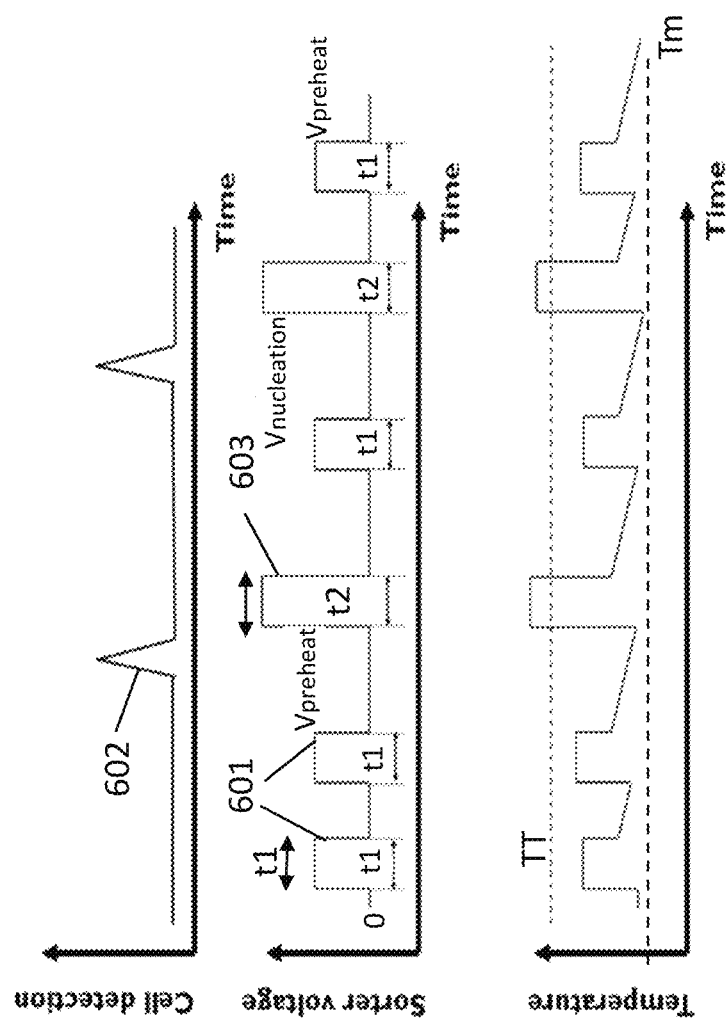
FIG. 6 illustrates a sequence of preheating pulses and powering pulses upon object detection, as well as the temperature variation, according to an example embodiment of the present disclosure.

By way of illustration, embodiments of the present disclosure not being limited thereto, a number of exemplary methods will be discussed with reference to the drawings. In a first example, a method applying pre-heating is described. For example, FIG. 6 shows a time graph of object detection events (upper graph), voltage pulses applied to an actuator (middle graph) comprising for example powering signals upon object detection, and finally temperature of nucleation sites (lower graph). In this embodiment of the method, preheating pulses 601 with a duration t1 are being periodically introduced, keeping the temperature over a minimum temperature Tm, but not surpassing the nucleation threshold temperature TT. When a object detection event 602 takes place, a nucleation signal 603 (e.g. a voltage pulse with a duration t2) is introduced, the temperature surpasses the nucleation threshold temperature TT, and actuation takes place. Then, the preheating pulse sequence can start again (e.g. after a predetermined time passes after a powering signal, or by measuring the dropping temperature and triggering preheating before it drops under the minimum temperature Tm), until a new detection event takes place. Thus, the nucleation always takes place at roughly the same predetermined temperature.

Figure 7:
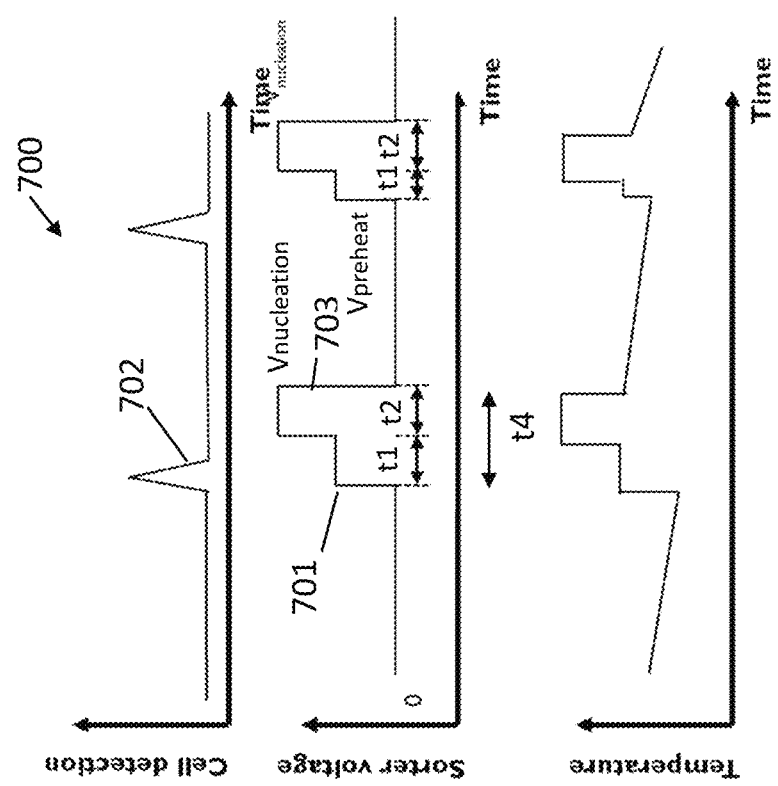
FIG. 7 illustrates an asynchronous sequence of preheating pulses and nucleation pulses according to example embodiments of the present disclosure.

In some embodiments, as shown in the drawing 700 of FIG. 7, a pre-heating pulse 701 can be introduced at the moment a object detection event 702 has taken place. The temperature gap necessary to produce nucleation is reduced as compared to the case without a preheating pulse, making the power dissipation more controllable, especially in nucleation sites. The preheating pulse may have a duration t1 and finish just when the nucleation signal 703 is triggered. Thus, if the powering signal is on for a duration t2, the total duration of the combination of pulses would be t4. The duration and amplitude of the pre-heating pulses may be fixed, but these parameters can be adjusted (e.g. controlled with a feedback loop, or controller module comprising temperature measurement) for each preheating pulse.

In some embodiments, the preheating pulses may underlap the powering signal, as shown in the drawing 710 of FIG. 7 [cont'd]. Thus, the preheating pulse 711 is disconnected from the powering pulse 713, allowing for a period t5 between the end of the preheating pulse and the start of the powering pulse in which there in no powering, and in which there is cooling. This embodiment helps to spread the heat more evenly in the generally heterogeneous heating element.

Figure 8:
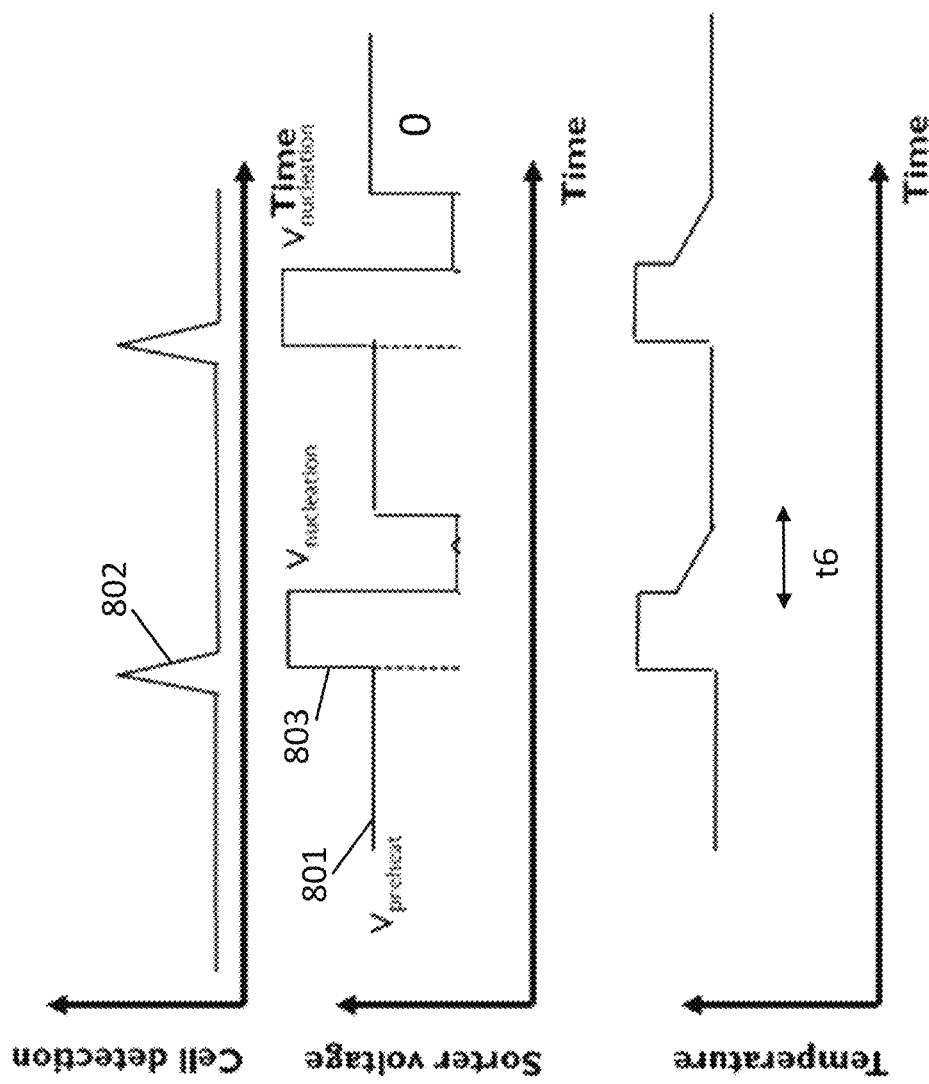
FIG. 8 illustrates continuous heating and asynchronous nucleation pulses and alongside switching off of the continuous heating, according to example embodiments of the present disclosure.

In some embodiments, the method comprises providing isothermal conditions in the actuator. For example, the method may comprise introducing continuous heating of the actuator, for example by heating the whole actuator cavity, or the substrate on which the actuator is provided, with external heating means and/or by adjusting the power source for introducing a current, smaller than the powering signal, in a heating element. In further embodiments, as shown in FIG. 8, the method may comprise introducing a continuous preheating voltage 801 and, upon a detection event 802, introducing a powering pulse 803, then turning off the powering pulse 803 and the continuous heating 801 for an interval of time t6, in order to compensate for the added dissipated power of the powering signal and allow a cooling down period (thus avoiding for example damages or excessive jet flow in further actuations). Embodiments of the present method may comprise a pre-calibration step for determining the optimum interval at which the continuous heating should be off after a powering pulse. The method may also include iterative calculation of the interval, for example by means of a feedback loop.

In some embodiments of the present disclosure, the method further comprises measuring the temperature of a heating element, for example measuring the temperature of the heating element by sensing its resistance (self-sensing temperature resistor). For example, measuring the temperature may comprise introducing a probe pulse (e.g. probe current pulse) before nucleation starts (e.g. upon object detection).

Figure 9:
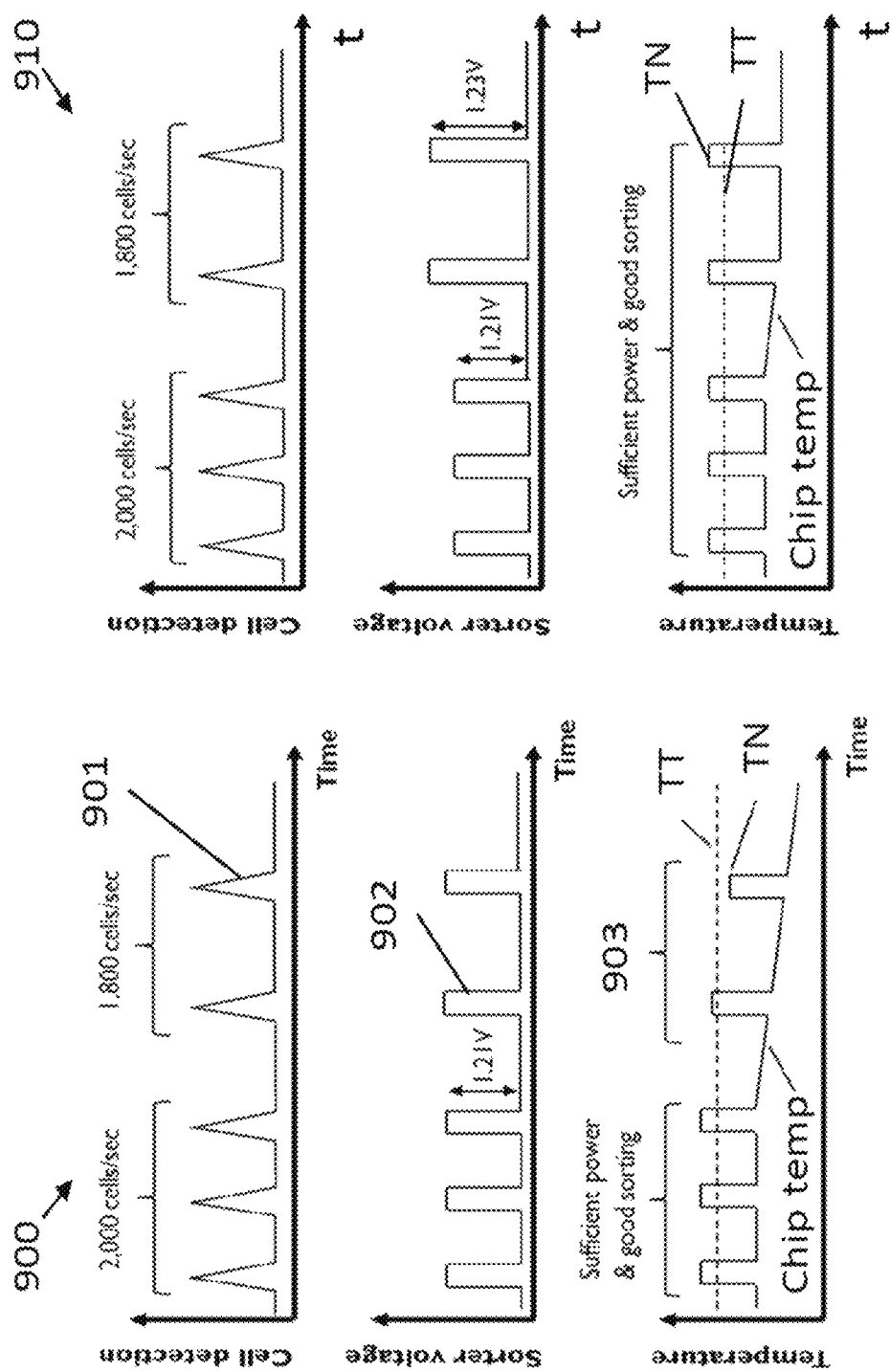
FIG. 9 illustrates active adaptation of nucleation signal with temperature compensation according to example embodiments of the present disclosure, compared to an implementation with no compensation.

In some embodiments of the present disclosure, the method further comprises compensation for temperature variation by providing pulse amplitude modulation, or adjusting height or width (e.g. via modulation), of the powering signal, e.g. according to the temperature measured in the heating element. FIG. 9 shows the pulse scheme for an actuator with no temperature compensation (left set of schemes 900) and with temperature compensation (right set of schemes 910). In the case of no temperature compensation, the throughput may drop below a predetermined value (e.g. under 2000 objects per second, e.g. around 1800 objects/s). For the same pulse of around 1.21 V, there are less detection events 901, the powering pulses 902 become less numerous, the chips cools down, and the temperature of the nucleation sites TN may not reach the predetermined temperature, reducing the power and obtaining poor sorting in the time period 903. It may even drop under the threshold temperature TT for nucleation. On the right set of schemes 910 of FIG. 9, when the detection events drop under a given value, the method may increase the amplitude (e.g. 1.23 V) of the powering pulses 912, the temperature of the nucleation sites can be adjusted and stabilized, so the nucleation takes place at the same or similar temperature, ensuring that in any case the temperature will always be over the threshold TT. The adjustment can be automated. In this embodiment, preheating pulses are not used, and energy may be saved. However, this embodiment may be readily combined with preheating pulses for higher stability, especially in cases in which the triggering rate is very variable and strong cooling down of the chip may take place.

Some embodiments of the present disclosure may comprise detecting the bubble nucleation event and controlling the signal before, during and after nucleation.

Figure 10:
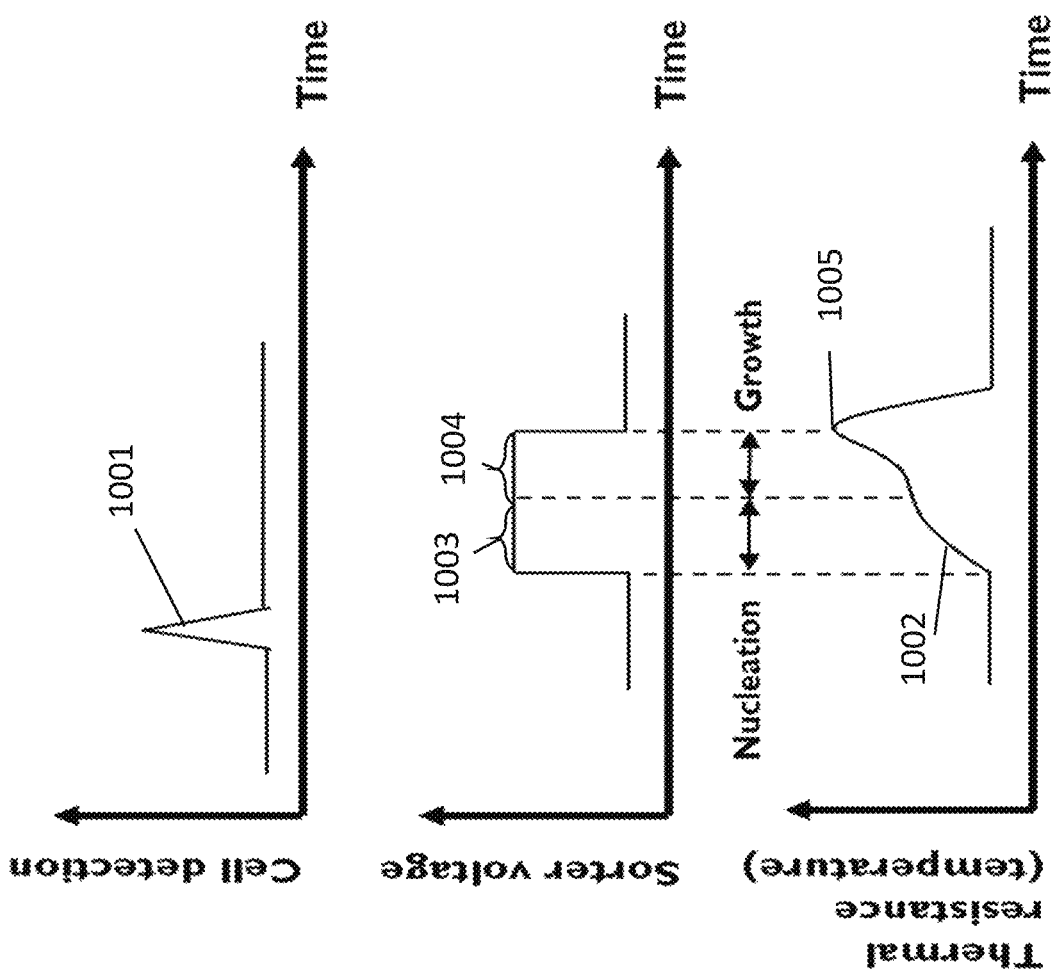
FIG. 10 illustrates in-pulse power control of an actuator, according to example embodiments of the present disclosure.

For example, the method may comprise measuring the temperature with high temporal resolution, allowing IPPC. Some embodiments may comprise measuring thermal resistance of the heating element while triggering the actuator. The scheme of the method, shown in FIG. 10, may comprise, powering the heating element upon object detection 1001, and maintaining a constant powering signal until an inflection point 1002 in the temperature (e.g. obtained by resistance measurements) is detected, which means that a bubble nucleates and the heating element cools down (region 1003). After the first inflection (region 1004), as long as the powering signal is on, the temperature keeps rising, while the microbubble grows. The growth period directly determines the jet flow power and duration, and is thus it can be pre-calibrated for various actuating and jet flow power needs matching specific flow conditions such as current pulse height, flow rate, channel design, chip temperature, etc. When the powering signal is turned off, a second inflection 1005 can be detected.

Figure 11:
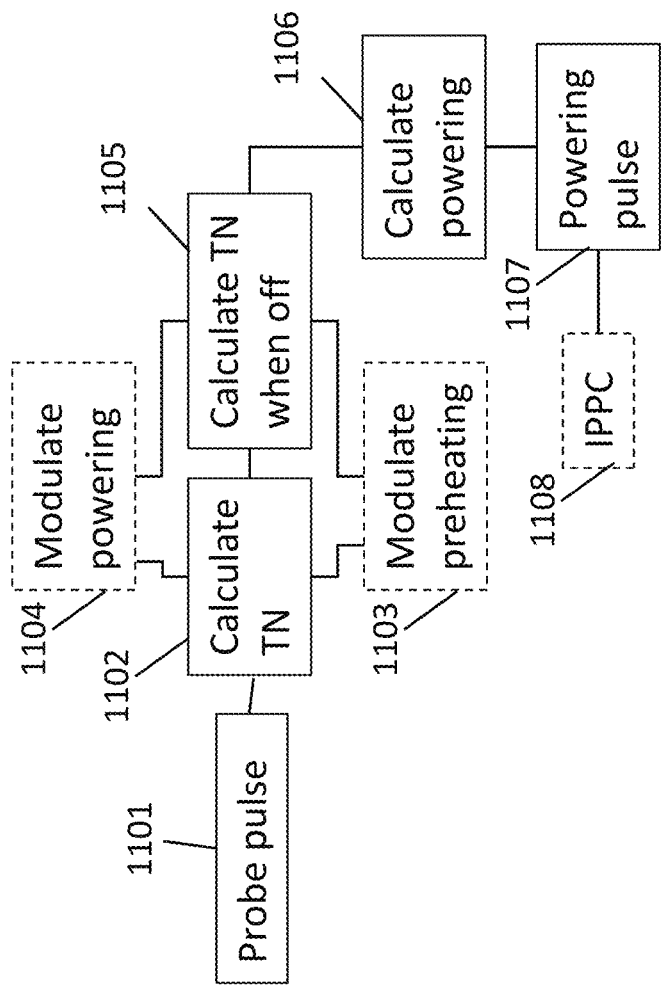
FIG. 11 shows a flowchart of a method to control a microfluidic actuator, according to example embodiments of the present disclosure.

An exemplary embodiment of the present method will be explained with reference to the diagram of FIG. 11. In embodiments of the present disclosure, when a object is detected, a small probe pulse is sent 1101. In this context, small means a probe signal, for example smaller than the signal needed to produce nucleation. The probe pulse should be sufficiently low in amplitude and short in duration; because it should not create vapor bubbles. Otherwise this would interfere with the jet flow power of the actual sorting event. Moreover, the heat injected by the probe pulse should have minimal influence on the temperature it measures. The heat should be dissipated as quickly as possible, so that the hotspot temperature falls back to the baseline (e.g. chip temperature, temperature of unpowered heating element) after the probe pulse is turned off and before the powering pulse is turned on. Additionally, it may deliver good signal to noise ratio to accurately determine the temperature of the nucleation site. Then, the nucleation site temperature TN is measured 1102 (e.g. measuring the resistance while the probe pulse is on and then calculating the temperature, for example using models, lookup tables, in a processor, etc.). Optionally, the method may comprise the step of modulating 1103 a pre-heating pulse width (or pulse duration), and/or modulating 1104 powering pulse height or width, depending on the measured temperature. Then, when the probe pulse is turned off, the nucleation site temperature is again calculated 1105. Then, powering pulse width and/or height is calculated 1106 and finally the powering pulse is sent 1107 to the heating element. Optionally, the nucleation site temperature can be also measured 1108 during powering, allowing adjusting the height or width of the powering pulse in real time.

The jet flow power can be automatically adjusted depending on the temperature. This will reduce the jet flow power variation and prevents wearing of the sorter heating elements.

Some embodiments of the present disclosure comprise calculating the heating element temperature from the resistance measurement, and for example extracting the component from the resistance of the nucleation sites from the total resistance of the heating comprising contributions of the wires, the nucleation spots, and the rest (bulk) of the heating element and microheaters. In general, the electrical wires can be chosen to have low resistance spread over large area, so they will usually heat up least. The nucleation spot's resistance is high and its current density is high. This part will contribute most in the resistance variation with a current pulse as this part will heat up most. The rest of the heater will also heat up because of its resistance and heat conducted from nucleation sites. At high heating rates, nucleation spots will have a much higher temperature than the rest of the heater elements. The resistance and temperature of every resistance part (including the temperature of the nucleation site) can be simulated in computer modelling. With the same current pulse excitation, the total heater resistance can be measured. In this way, it is possible to correlate the unmeasurable hotspot temperature with the measured resistance.

Figure 12:
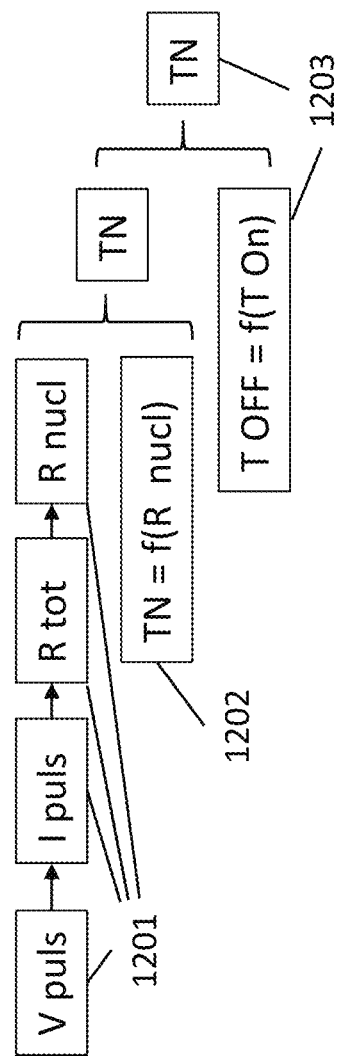
FIG. 12 illustrates a flowchart of a method to calculate and extract the temperature of a nucleation site in a microheater, according to example embodiments of the present disclosure.

FIG. 12 shows an exemplary method to obtain the nucleation spot temperature TN of an actuator. In the first step 1201, the voltage pulse is converted to current, resistance is obtained and the resistance R of nucleation sites extracted.

The device was applied a short voltage pulse (sent and measured by the driving circuit) to induce the current pulse over the heater. The current pulse was measured with a 0.1 ohm sensing resistor off the chip. Hence the total device resistance was calculated as R_total=V_pulse/I_pulse−0.1. The total resistance was approximately 4.2 ohm. The hotspot resistance (1 ohm) was previously measured and simulated without heating.

In the second step 1202, the temperature of the nucleation sites is calculated as a function of R. The correlation between hotspot resistance and temperature was also simulated in finite element modeling. One sample fitting is shown by Eq. 1, where R is the measured hotspot resistance. Every hotspot temperature is associated with a single hotspot resistance. In this way, both the hotspot resistance and temperature can be measured every time a probe pulse or nucleation pulse is fired. In these measurements, the nucleation voltage pulse amplitude stayed constant. The heater temperature rose, and thus the heater resistance increased and current decreased.

$$T_N = -1019R^2 + 3012R - 1635 \quad \text{(Eq. 1)}$$

In the third step 1203, the temperature of the nucleation site is calculated after the pulse is off.

Figure 13:
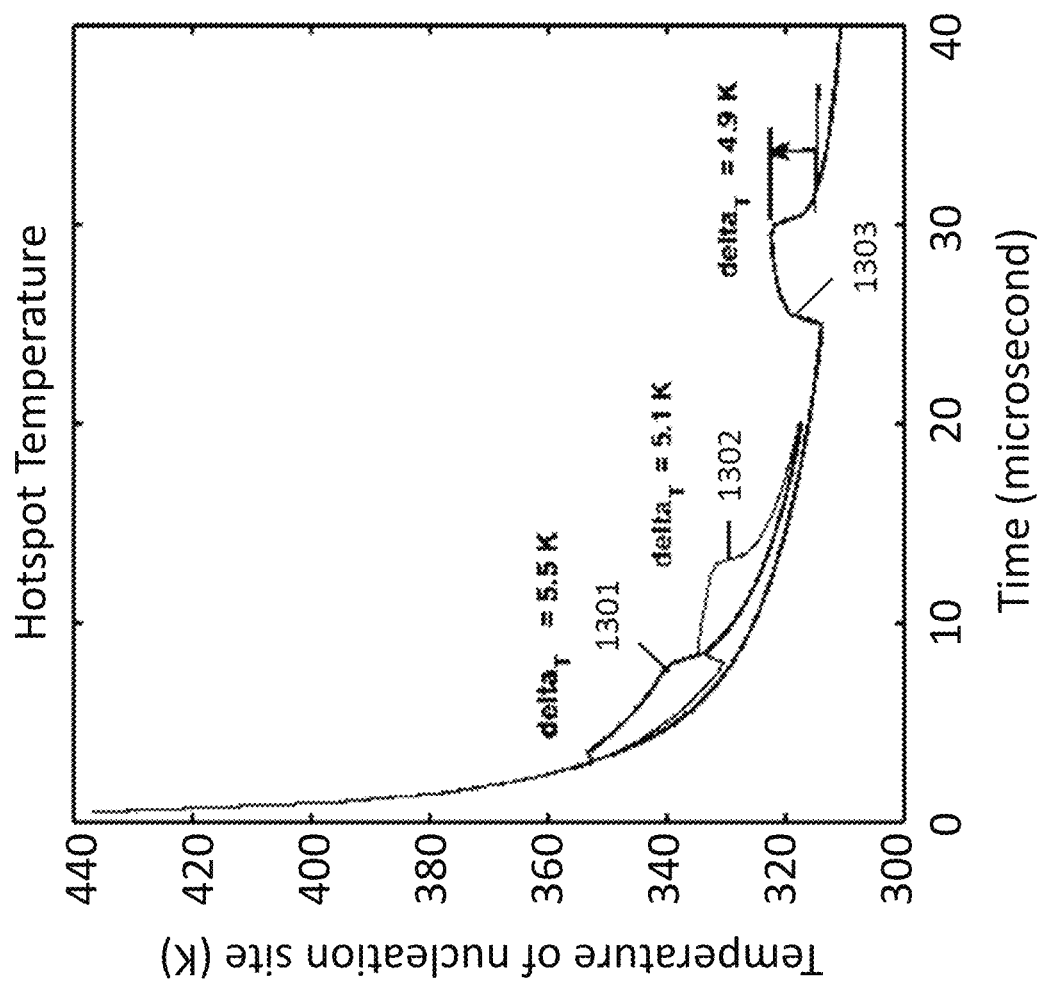
FIG. 13 illustrates the edge variation of three probe pulses on a nucleation site during cool down, according to example embodiments of the present disclosure.

When the probe pulse is simply used for hotspot temperature measurement but not for preheating, it would be important to estimate the hotspot temperature after the probe pulse is turned off (or right before the subsequent nucleation pulse is turned on). The resistance is not measurable without an electrical current as measurement signal. Therefore, the hotspot temperature is correlated before and after the current pulse is switched off. FIG. 13 shows the simulated hotspot temperature for 3 small probe pulses (1V, 5 μs) 1301, 1302, 1303 during a chip cooling phase. In this way, the height of the falling edge slightly differs for different heating element temperatures. With this simulation, it is possible to extract the hotspot temperature after the probe pulse is turned off, where Tpulseon equalizes TN from step 1202:

$$T_{PulseOff} = 584.8 - \sqrt{255365 - 571.1 \times T_{PulseOn}} \quad \text{(Eq. 2)}$$

where $T_{pulseoff}$ is the hotspot temperature 2 μs after the probe pulse, and $T_{pulseon}$ is the hotspot temperature measured during the probe pulse. With Eq. 2, it is possible to measure the hotspot temperature with the small probe pulse after the pulse is applied and to estimate better the temperature when the nucleation pulse is applied.

For parallel fluidic channels, every channel uses its own heater as a self-sensing temperature sensor and combine measurements from others on the same chip to improve the performance. A four point probe resistance measurement can be used to improve the measurements.

In some embodiments, the disclosed devices and methods prevent damage and reduce wear to on-chip heating elements in actuators based on generation of vapor bubbles. Furthermore, some embodiments objects to be sorted at a rate of more than 10,000 objects per second with varying throughput while keeping the chip at a constant temperature leading to a precisely timed and powered jet flow actuation.

In a further aspect, the present disclosure relates to a processor for performing a method for selecting objects in a fluid stream as described above. The above described method embodiments may be implemented as software in a processor. One configuration of such a processor may for example include at least one programmable computing component coupled to a memory subsystem that includes at least one form of memory, e.g., RAM, ROM, and so forth. It is to be noted that the computing component may be a general purpose, or a special purpose computing component, and may be for inclusion in a device, e.g., a chip that has other components that perform other functions. Thus, one or more aspects of the present disclosure can be implemented in digital electronic circuitry, or in computer hardware, firmware, software, or in combinations of them. For example, one, more or each of the method steps of selecting objects in a fluid stream or generating a jet may be implemented in the processor. Thus, the disclosure provides a system that includes the instructions for selecting objects in a fluid stream or generating a jet.

The present disclosure thus also includes a computer program product which provides the functionality of any of the methods according to the present disclosure, or one, more or all steps thereof, when executed on a computing device. Vice versa, the computer program products described above may be implemented as hardware in computing devices. Alternatively, the computer program products may be implemented as computer-implemented methods and the present disclosure therefore also relates to the corresponding computer-implemented methods.

In another aspect, the present disclosure relates to a data carrier for carrying a computer program product as described above. Such a data carrier may comprise a computer program product tangibly embodied thereon and may carry machine-readable code for execution by a programmable processor. The present disclosure thus relates to a carrier medium carrying a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media. Non-volatile media includes, for example, optical or magnetic disks, such as a storage device which is part of mass storage. Common forms of computer readable media include, a CD-ROM, a DVD, a flexible disk or floppy disk, a tape, a memory chip or cartridge or any other medium from which a computer can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications.

The invention claimed is:

1. A microfluidic actuator for selecting objects in a fluid stream comprising a plurality of objects, the actuator comprising:
   an object detection means adapted for, upon arrival of an object, identifying whether an object is an object of interest,
   a heater adapted for generating a jet flow for deflecting an object of interest from the fluid stream, and
   a controller configured for activating the heater as function of the detection of an object of interest using a nucleation signal;
   wherein the controller is configured for obtaining temperature information of the heater and for adjusting a nucleation signal for the heater taking into account the obtained temperature information, and wherein the controller is adapted for sending a probe pulse to the heater for measuring the temperature before a jet flow inducing nucleation pulse is fired for generating the jet flow, the probe pulse having an amplitude and duration low enough such that the temperature of the heater falls back to a baseline after the probe pulse is turned off and before the nucleation pulse is turned on.

2. The microfluidic actuator of claim 1, wherein the heater is a resistive heater and wherein the actuator is adapted for measuring a resistance of the heater for obtaining temperature information of the heater.

3. The microfluidic actuator of claim 1, wherein the controller is adapted for sending the probe pulse whereby the probe pulse is adapted for inducing pre- heating of the heater.

4. The microfluidic actuator of claim 1, wherein the actuator comprises a closed loop between the object detection means, the heater, and the controller for modulating a jet flow inducing nucleation pulse as function of varying object throughput and arrival time between objects.

5. The microfluidic actuator of claim 1, wherein the controller is adapted for adjusting a nucleation signal by adjusting the height or width of a jet flow inducing nucleation pulse for generating the jet flow.

6. The microfluidic actuator of claim 1, wherein the controller is adapted for inducing a number of pre-heating nucleation pulses for obtaining a constant temperature prior to generating the jet flow.

7. The microfluidic actuator of claim 1, wherein the controller is adapted for varying a pulse width or amplitude of a pre-heating pulse for obtaining a constant temperature prior to generating the jet flow, by means of a closed loop algorithm.

8. The microfluidic actuator of claim 1, wherein the controller is adapted for performing in-pulse nucleation control of the jet flow inducing nucleation pulse for generating the jet flow.

9. The microfluidic actuator of claim 1, wherein the heater comprises a plurality of microheaters, each comprising at least one microbubble nucleation site.

10. A microfluidic system comprising the microfluidic actuator of claim 1 for selecting object(s) of interest.

11. A diagnostic device comprising the microfluidic system of claim 10.

\* \* \* \* \*